(12) United States Patent
Guo et al.

(10) Patent No.: US 11,719,070 B1
(45) Date of Patent: Aug. 8, 2023

(54) PRESET THREE-STAGE ADJUSTABLE DOWNHOLE CHOKE WITH CHOKING AND PRESSURE MEASUREMENT FUNCTIONS

(71) Applicants: SICHUAN UNIVERSITY, Chengdu (CN); Yibin Industrial Technology Research Institute of Sichuan University, Yibin (CN)

(72) Inventors: Xin Guo, Chengdu (CN); Zechuan Huang, Chengdu (CN); Wu Zhao, Chengdu (CN); Kai Zhang, Yibin (CN); Miao Yu, Yibin (CN); Yiwei Jiang, Chengdu (CN); Mingyue Yang, Chengdu (CN); Chong Jiang, Chengdu (CN); Bing Lai, Chengdu (CN); Xingyu Chen, Chengdu (CN); Bo Wu, Chengdu (CN); Jun Li, Chengdu (CN)

(73) Assignees: SICHUAN UNIVERSITY, Chengdu (CN); Yibin Industrial Technology Research Institute of Sichuan University, Yibin (CN)

( * ) Notice: Subject to any disclaimer, the term of this patent is extended or adjusted under 35 U.S.C. 154(b) by 0 days.

(21) Appl. No.: 18/174,637

(22) Filed: Feb. 26, 2023

(30) Foreign Application Priority Data

Mar. 16, 2022 (CN) .......................... 202210256998.8

(51) Int. Cl.
 *E21B 34/06* (2006.01)
 *E21B 43/08* (2006.01)

(52) U.S. Cl.
 CPC ............ *E21B 34/066* (2013.01); *E21B 43/08* (2013.01)

(58) Field of Classification Search
 CPC ......... E21B 34/06; E21B 34/066; E21B 43/08
 See application file for complete search history.

(56) References Cited

U.S. PATENT DOCUMENTS

| 5,133,383 A * | 7/1992 | King | .................. F16K 47/04 |
| | | | 251/282 |
| 5,896,924 A * | 4/1999 | Carmody | ............... E21B 43/123 |
| | | | 166/69 |

(Continued)

FOREIGN PATENT DOCUMENTS

| CN | 2758458 Y | 2/2006 |
| CN | 202673241 U | 1/2013 |

(Continued)

OTHER PUBLICATIONS

Yongquan Xu, Research on downhole throttling technology for Xushen Gasfield in Daqing, Department of Control Science and Engineering Zhejiang University, 2014, pp. 1-75.

(Continued)

*Primary Examiner* — Taras P Bemko
(74) *Attorney, Agent, or Firm* — Bayramoglu Law Offices LLC (57) ABSTRACT

A preset three-stage adjustable downhole choke with choking and pressure measurement functions includes an intake assembly for natural gas filtration, an electrically-controlled telescopic assembly for positioning and clamping the downhole choke with a prefabricated seating nipple, and a three-stage choking assembly for natural gas choking and depressurization. The intake assembly, the electrically-controlled telescopic assembly, and the three-stage choking assembly are sequentially communicated from bottom to top. A first-stage control choke, a second-stage adjustable control choke, and a third-stage control choke are sequentially provided in a gas passage of the three-stage choking assembly from bottom to top. The preset three-stage adjustable downhole choke features convenient installation and removal, three-stage choking and depressurization, and an (Continued)

adjustable orifice diameter of a control choke, and can achieve different choking and depressurization effects.

8 Claims, 4 Drawing Sheets

(56) References Cited

U.S. PATENT DOCUMENTS

| | | | | |
|---|---|---|---|---|
| 6,328,112 | B1* | 12/2001 | Malone | E21B 34/06 |
| | | | | 166/332.6 |
| 6,371,210 | B1* | 4/2002 | Bode | E21B 43/12 |
| | | | | 166/370 |
| 7,055,598 | B2* | 6/2006 | Ross | E21B 43/12 |
| | | | | 166/236 |
| 9,371,714 | B2* | 6/2016 | Tubel | E21B 34/066 |
| 2005/0098349 | A1 | 5/2005 | Krueger et al. | |
| 2011/0162843 | A1 | 7/2011 | Maier et al. | |
| 2015/0027691 | A1 | 1/2015 | Scull | |
| 2016/0123112 | A1* | 5/2016 | Purkis | E21B 34/14 |
| | | | | 166/330 |
| 2017/0276252 | A1* | 9/2017 | McCaskill | F16K 47/08 |
| 2019/0010783 | A1* | 1/2019 | Frosell | E21B 43/12 |
| 2020/0370394 | A1* | 11/2020 | Cai | E21B 34/066 |
| 2022/0356781 | A1* | 11/2022 | Fripp | E21B 43/12 |

FOREIGN PATENT DOCUMENTS

| | | |
|---|---|---|
| CN | 103452526 A | 12/2013 |
| CN | 203321499 U | 12/2013 |
| CN | 103620159 A | 3/2014 |
| CN | 104632172 A | 5/2015 |
| CN | 105201464 A | 12/2015 |
| CN | 106988709 A | 7/2017 |
| CN | 109424357 A | 3/2019 |
| CN | 209603908 U | 11/2019 |
| CN | 111502611 A | 8/2020 |
| CN | 112796714 A | 5/2021 |
| WO | 2017029606 A1 | 2/2017 |

OTHER PUBLICATIONS

Liu Ying, et al., Multi-objective optimization of hydrostatic bearing of hollow shaft based on surrogate model, Journal of Jilin University (Engineering and Technology Edition), 2017, pp. 1130-1137, vol. 47, No. 4.

He Mingge, et al., Design and Flow Field Analysis of Downhole Intelligent Throttle, China Petroleum Machinery, 2013, pp. 85-89, vol. 41, No. 6.

Zhang Kai, et al., Dynamic Real-time Monitoring and Control of Reservoirs, Oil Field Equipment, 2010, pp. 4-8, vol. 39, No. 4.

* cited by examiner

PRESET THREE-STAGE ADJUSTABLE DOWNHOLE CHOKE WITH CHOKING AND PRESSURE MEASUREMENT FUNCTIONS

CROSS REFERENCE TO THE RELATED APPLICATIONS

This application is based upon and claims priority to Chinese Patent Application No. 202210256998.6, filed on Mar. 16, 2022, the entire contents of which are incorporated herein by reference.

TECHNICAL FIELD

The present disclosure relates to the technical field of gas production of oil and gas reservoirs, and in particular to a preset three-stage adjustable downhole choke with choking and pressure measurement functions.

BACKGROUND

Natural gas is a multi-component mixed gaseous fossil fuel, which easily generates a hydrate to block the pipeline under high-pressure and low-temperature conditions. In the process of natural gas exploitation, in order to avoid the natural gas hydrate from being generated to block the production string and to improve production efficiency, it is necessary to mount a choking and depressurization device to reduce the pressure of natural gas, so as to achieve the purpose of stable production.

At present, as a tool to prevent hydrate formation during natural gas production, downhole chokes have been applied in natural gas wells. The downhole chokes are divided into slip-type downhole chokes and preset downhole chokes according to the different setting modes. After the slip-type downhole choke reaches an expected downhole depth, it is set by lifting a slickline to make the slip deformed, expanded, and clamped on the inner wall of the tubing. The preset downhole choke is set by lowering it into a preset seating nipple that is pre-connected to the production string.

The downhole chokes are divided into single-stage downhole chokes, two-stage downhole chokes, and multi-stage downhole chokes according to the number of control chokes. At present, most downhole chokes are single-stage downhole chokes. In the production process of a gas field, in order to meet the production needs, it is often necessary to use a plurality of single-stage downhole chokes in series, which results in high costs. Therefore, the development of a multi-stage downhole choke is of great significance for saving costs and reducing operational errors.

At present, most downhole chokes still have a problem in that the orifice diameter of the control choke is not adjustable. With the passage of production time, the production of the gas well is changed, and the requirements for the choking performance of the control choke are also changed. Usually, the downhole choke is fished to the ground, and the control choke is replaced with one having a different orifice diameter for re-entry. The orifice diameter of the new control choke is determined by the ground staff according to the downhole pressure. Therefore, after the downhole choke is fished out, it is usually necessary to lower a pressure gauge to test the downhole pressure, which is tedious, labor-intensive, and time-consuming. Therefore, it is an urgent technical problem for those skilled in the art to design a downhole choke that is provided with an adjustable-orifice control choke and has a function of measuring the downhole pressure.

SUMMARY

In view of the above problems, the present disclosure provides a preset three-stage adjustable downhole choke with choking and pressure measurement functions. The downhole choke of the present disclosure features convenient installation and removal, a three-stage choking structure, an adjustable orifice diameter of a control choke, convenient downhole pressure measurement, and can achieve different choking and depressurization effects.

The present disclosure adopts the following technical solution. The preset three-stage adjustable downhole choke with choking and pressure measurement functions includes an intake assembly for natural gas filtration, an electrically-controlled telescopic assembly for positioning and clamping the downhole choke with a prefabricated seating nipple, and a three-stage choking assembly for natural gas choking and depressurization, where the intake assembly, the electrically-controlled telescopic assembly, and the three-stage choking assembly are sequentially communicated from bottom to top. A first-stage control choke, a second-stage adjustable control choke, and a third-stage control choke are sequentially provided in a gas passage of the three-stage choking assembly from bottom to top.

Further, the intake assembly includes a bottom stopper and an intake cylinder sleeved on the bottom stopper. The intake cylinder includes an upper part sleeved with a lower partition plate connected to the electrically-controlled telescopic assembly and a lower part provided with an intake opening.

Further, a plurality of intake openings are uniformly arranged on a lower wall of the intake cylinder. A sand control cylinder is provided in the intake openings, and the sand control cylinder is coaxial with the intake cylinder.

Further, the electrically-controlled telescopic assembly includes a lower outer pipe with a bottom part connected to the intake assembly. A lower inner pipe is nested in the lower outer pipe. A circular packing sleeve is nested between the lower outer pipe and the lower inner pipe. A telescopic positioning device is arranged between the lower outer pipe and the circular packing sleeve.

Further, the telescopic positioning device includes an extension element provided on a side wall of the lower outer pipe. The extension element is provided in a groove on the side wall of the lower outer pipe through a return spring. An inner central part of the extension element is fixedly connected to push rod. The push rod penetrates the side wall of the lower outer pipe and extends into a space between the lower outer pipe and the circular packing sleeve. An extension motor is provided between the lower outer pipe and the circular packing sleeve. The extension motor is drivingly connected to a telescopic rod. An end of the telescopic rod away from the extension motor is fixedly connected to an oblique push element. The oblique push element is connected to the push rod in a contact manner.

Further, a plurality of telescopic positioning devices are uniformly distributed on the side wall of the lower outer pipe. A pulley is rotatably connected to an end of the push rod away from the extension element. The pulley is connected to the oblique push element in a contact manner.

Further, an electrical control system assembly is provided between the lower inner pipe and the circular packing sleeve. The electrical control system assembly is connected to the extension motor in an electrical control manner. A top end of the lower outer pipe is provided with a partition pipe string. An upper part of the partition pipe string is connected to the three-stage choking assembly.

Further, the three-stage choking assembly includes an outer pipe string with a lower end connected to an upper end of the electrically-controlled telescopic assembly. An inner pipe string is nested in the outer pipe string. A central boss of the inner pipe string is threaded with the first-stage control choke. An intermediate pipe string is nested between the outer pipe string and the inner pipe string. An upper part of the intermediate pipe string is provided with the second-stage adjustable control choke. A lower part of the second-stage adjustable control choke is provided with a second-stage control choke placement sleeve. A lower part of the second-stage control choke placement sleeve is fixedly connected to an upper part of the inner pipe string.

Further, the second-stage adjustable control choke includes a bottom annulus and a top annulus. A rotary table is provided in the bottom annulus. A plurality of blades are uniformly distributed between the rotary table and the top annulus. Upper and lower ends of each of the blades are provided with positioning posts, respectively. The positioning posts are arranged in track slots on the top annulus and the rotary table, respectively. A choking shell is provided between the bottom annulus and the top annulus. An outer shell is sleeved outside the choking shell. A bottom part of the outer shell is fixedly connected to a top part of the second-stage control choke placement sleeve. A gear meshing with an outer edge of the rotary table is further provided in the bottom annulus. The gear is dynamically connected to a rotating shaft. The rotating shaft is drivingly connected to a rotating motor. The rotating motor is provided between the upper part of the intermediate pipe string and the upper part of the inner pipe string. The rotating motor is connected to the electrical control system assembly in an electrical control manner.

Further, a third-stage control choke positioning pipe string is nested in an upper part of the outer pipe string. A connecting pipe is nested in an upper part of the third-stage control choke positioning pipe string. An inner lower part of the connecting pipe is threaded with the third-stage control choke. An inner central part of the connecting pipe is fixedly provided with a spring fixing seat. The spring fixing seat is provided with a vent hole. An upper end of the third-stage control choke is provided with a conical head. The conical head is connected to the spring fixing seat through a compression spring. The compression spring is provided with a displacement sensor. The displacement sensor is connected to the electrical control system assembly in a communication manner. A fishing head is sleeved outside an upper end of the connecting pipe. A lower part of the fishing head is fixedly connected to the outer pipe string.

The present disclosure has the following beneficial effects:

1. In the present disclosure, the preset three-stage adjustable downhole choke with choking and pressure measurement functions includes the intake assembly, the electrically-controlled telescopic assembly, and the three-stage choking assembly. The intake assembly serves as the inlet of natural gas into the downhole choke. It filters sand and other impurities in the natural gas through the sand control cylinder to ensure the quality of natural gas.
2. The electrically-controlled telescopic assembly mainly realizes the positioning and clamping of the downhole choke and the preset seating nipple on the production tubing. The extension motor rotates to drive the telescopic rod up and down, so as to raise or lower the oblique push element. When the oblique push element rises, it pushes the push rod. The push rod moves outward to push out the extension element, such that the extension element is fixed in the inner groove of the preset seating nipple, so as to realize the positioning and clamping of the downhole choke. When the oblique push element is lowered, the extension element is pulled by the return spring. The extension element disengages from the preset seating nipple and retracts into the groove of the lower outer pipe. The positioning and clamping of the downhole choke with the preset seating nipple is released to facilitate the removal of the downhole choke.
3. The three-stage choking assembly includes the first-stage control choke, the second-stage adjustable control choke, and the third-stage control choke. The first-stage control choke performs first-stage choking and depressurization of the high-pressure natural gas, effectively protecting the second-stage adjustable control choke and the third-stage control choke. The second-stage adjustable control choke has an adjustable orifice diameter, which can achieve different choking and depressurization effects and obtain different flow rates and pressures. The third-stage control choke realizes the third-stage choking and depressurization.
4. In the present disclosure, the matching design of the displacement sensor, the compression spring, and the conical head facilitates calculation of an output pressure of the third-stage control choke at any time according to the displacement of the conical head. The pressure measurement method can feed back the pressure to a ground system. The ground staff decides whether to adjust the orifice diameter of the second-stage adjustable control choke according to the third-stage natural gas pressure. In addition, measuring the output pressure of the third-stage control choke can also help the ground staff to further understand the real downhole conditions, so as to facilitate the follow-up of other downhole work.
5. The downhole choke of the present disclosure is further provided with the electrical control system assembly. According to the displacement data of the displacement sensor received by the ground system, the rotating motor is controlled to rotate so as to adjust the orifice diameter of the second-stage adjustable control choke. As required, the rotation of the extension motor can be controlled to control the clamping and separation of the electrical telescopic device and the preset seating nipple. The design has a high level of automation, can realize intelligent control according to needs, and is convenient and reliable.

Reference Numerals: 1. bottom stopper; 2. intake cylinder; 3. lower partition plate; 4. lower inner pipe; 5. extension motor; 6. telescopic rod; 7. oblique push element; 8. push rod; 9. pulley; 10. extension element; 11. return spring; 12. electrical control system assembly; 13. lower outer pipe; 14. partition pipe string; 15. outer pipe string; 16. intermediate pipe string; 17. inner pipe string; 18. rotating motor; 19. rotating shaft; 20. second-stage control choke placement sleeve; 21. third-stage control choke positioning string; 22. compression spring; 23. connecting pipe; 24. fishing head; 25. spring fixing seat; 26. displacement sensor; 27. conical head; 28. third-stage control choke; 29. second-stage adjustable control choke; 30. first-stage control choke; 31. circular packing sleeve; 32. sand control cylinder; 33. intake opening; 34. bottom annulus; 35. top annulus; 36. rotary table; 37. blade; 38. positioning post; 39. track slot; 40. choking shell; 41. outer shell; and 42. gear.

DETAILED DESCRIPTION OF THE EMBODIMENTS

In order to make the objectives, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are some, rather than all of the embodiments of the present disclosure. Generally, the components of the embodiments of the present disclosure described and shown in the drawings may be arranged and designed in various manners.

Therefore, the following detailed description of the embodiments of the present disclosure in the drawings is not intended to limit the protection scope of the present disclosure, but merely represent selected embodiments of the present disclosure. All other embodiments obtained by those of ordinary skill in the art based on the embodiments of the present disclosure without creative efforts should fall within the protection scope of the present disclosure.

It should be noted that similar reference signs and letters represent similar items in the drawings below. Therefore, once an item is defined in one drawing, it does not need to be further defined and described in subsequent drawings.

In the description of the present disclosure, it should be noted that orientations or position relationships indicated by terms such as "upper", "lower" and "inner" are orientation or position relationships shown in the accompanying drawings, and these terms are only used to facilitate description of the present disclosure and simplify the description, but not to indicate or imply that the mentioned apparatus or components must have a specific orientation or must be established and operated in a specific orientation, and thus these terms cannot be understood as a limitation to the present disclosure.

In addition, the terms such as "first" and "second" are used only for the purpose of description and cannot be understood to indicate or imply relative importance.

In the description of the present disclosure, it should be noted that, unless otherwise clearly specified and limited, meanings of terms "install", "connected to", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand specific meanings of the foregoing terms in the present disclosure based on a specific situation.

As shown in FIGS. 1 to 6, the present disclosure provides a preset three-stage adjustable downhole choke with choking and pressure measurement functions, including an intake assembly for natural gas filtration, an electrically-controlled telescopic assembly for positioning and clamping the downhole choke with a prefabricated seating nipple, and a three-stage choking assembly for natural gas choking and depressurization. The intake assembly, the electrically-controlled telescopic assembly, and the three-stage choking assembly are sequentially communicated from bottom to top. First-stage control choke 30, second-stage adjustable control choke 29, and third-stage control choke 28 are sequentially provided in a gas passage of the three-stage choking assembly from bottom to top.

Figure 1:
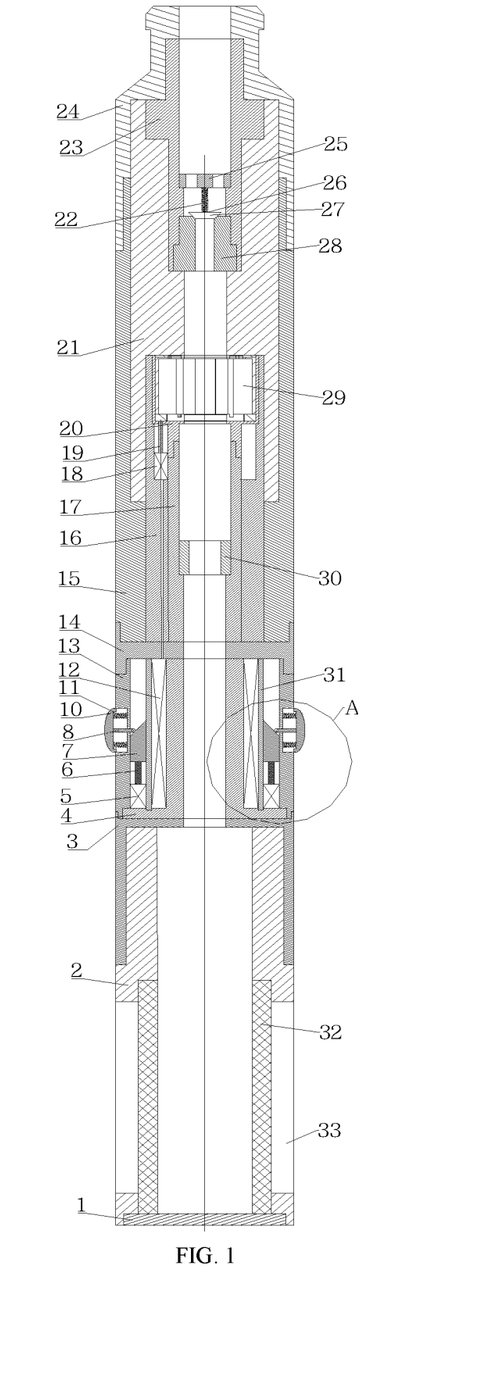
FIG. 1 is a sectional view of a preset three-stage adjustable downhole choke with choking and pressure measurement functions according to the present disclosure.

The intake assembly includes bottom stopper 1 and intake cylinder 2 sleeved on the bottom stopper 1. The intake cylinder 2 includes an upper part sleeved with lower partition plate 3 connected to the electrically-controlled telescopic assembly and a lower part provided with an intake opening 33. A plurality of intake openings 33 are uniformly arranged on a lower wall of the intake cylinder 2. Sand control cylinder 32 is provided in the intake openings 33, and the sand control cylinder 32 is coaxial with the intake cylinder 2.

The intake assembly serves as an inlet of natural gas into the preset three-stage adjustable downhole choke with choking and pressure measurement functions. The intake cylinder 2 is provided with the intake openings 33. The natural gas enters from the intake openings 33, then passes through the sand control cylinder 32 to achieve the purpose of filtration, and finally enters the preset three-stage adjustable downhole choke with choking and pressure measurement functions.

Figure 2:
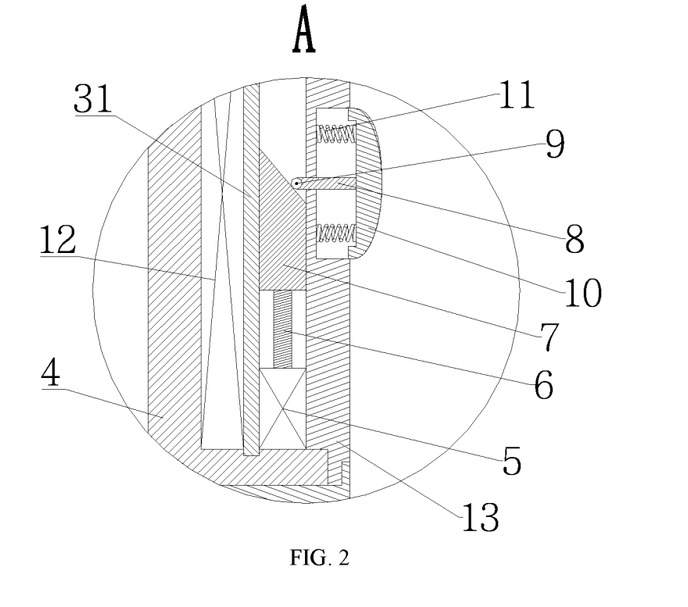
FIG. 2 is an enlarged view of A shown in FIG. 1.
Figure 3:
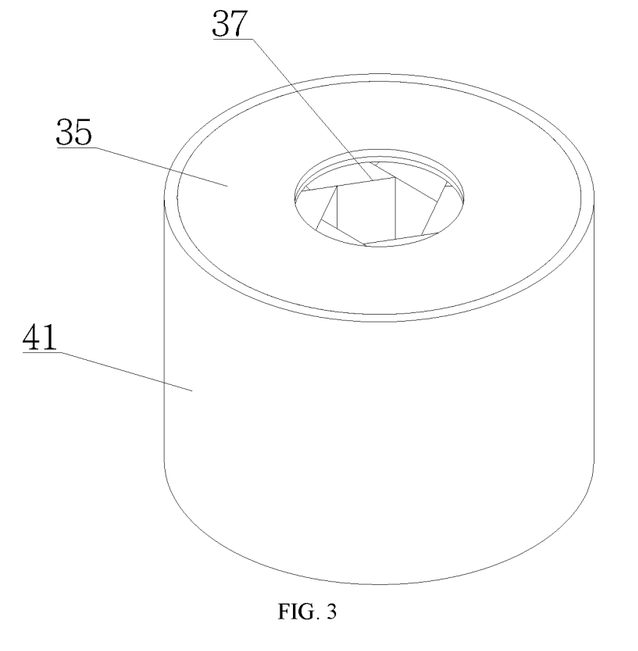
FIG. 3 is a stereoscopic view of a second-stage adjustable control choke according to the present disclosure.
Figure 4:
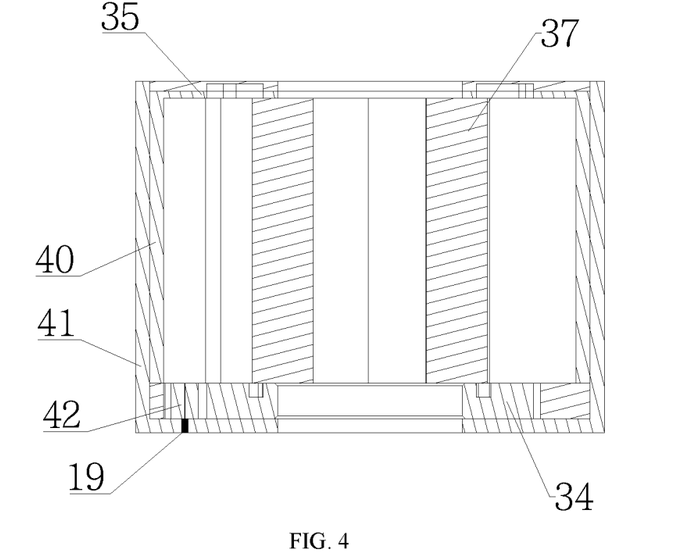
FIG. 4 is a sectional view of the second-stage adjustable control choke according to the present disclosure.
Figure 5:
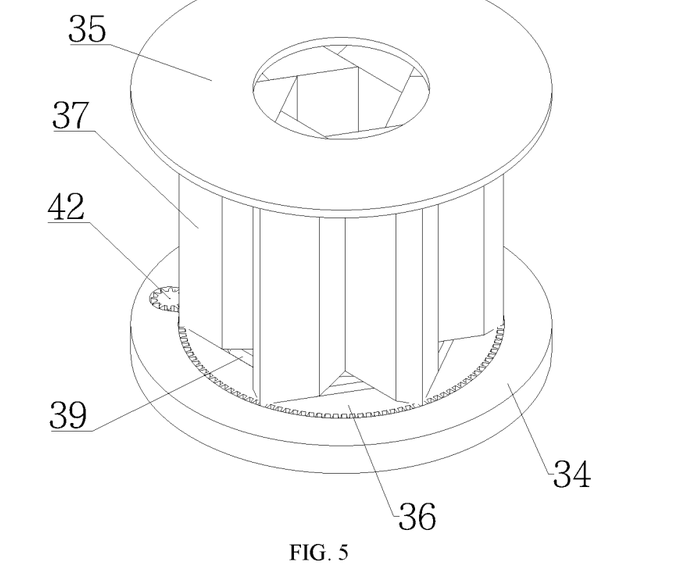
FIG. 5 is an interior view of the second-stage adjustable control choke (without an outer shell and a choking shell) according to the present disclosure.
Figure 6:
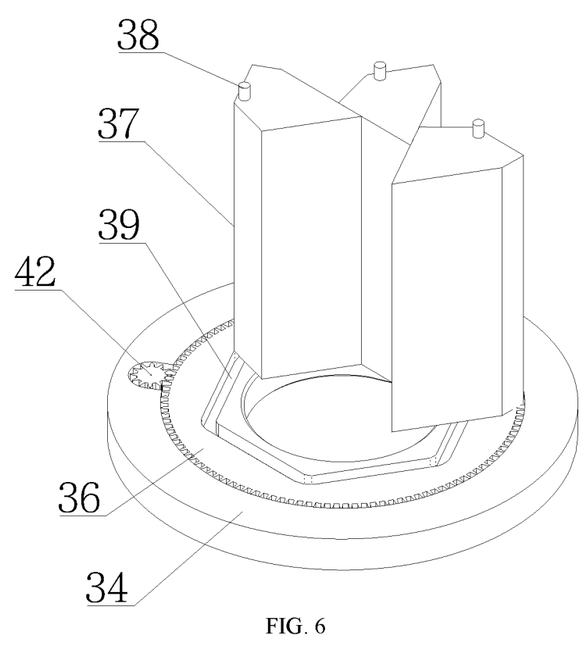
FIG. 6 is an interior view of the second-stage adjustable control choke (without a top annulus and some blades) according to the present disclosure.

The electrically-controlled telescopic assembly includes lower outer pipe 13 with a bottom part connected to the intake assembly. Lower inner pipe 4 is nested in the lower outer pipe 13. Circular packing sleeve 31 is nested between the lower outer pipe 13 and the lower inner pipe 4. A telescopic positioning device is arranged between the lower outer pipe 13 and the circular packing sleeve 31.

The telescopic positioning device includes extension element 10 provided on a side wall of the lower outer pipe 13. The extension element 10 is provided in a groove on the side wall of the lower outer pipe 13 through return spring 11. An inner central part of the extension element 10 is fixedly connected to push rod 8. The push rod 8 penetrates the side wall of the lower outer pipe 13 and extends into a space between the lower outer pipe 13 and the circular packing sleeve 31. Extension motor 5 is provided between the lower outer pipe 13 and the circular packing sleeve 31. The extension motor 5 is drivingly connected to telescopic rod 6. An end of the telescopic rod 6 away from the extension motor 5 is fixedly connected to oblique push element 7. The oblique push element 7 is connected to the push rod 8 in a contact manner.

A plurality of telescopic positioning devices are uniformly distributed on the side wall of the lower outer pipe 13. Pulley 9 is rotatably connected to an end of the push rod 8 away from the extension element 10. The pulley 9 is connected to the oblique push element 7 in a contact manner.

Electrical control system assembly 12 is provided between the lower inner pipe 4 and the circular packing sleeve 31. That is, the electrical control system assembly 12 is located in an annular space between the circular packing sleeve 31 and the lower inner pipe 4. The electrical control system assembly 12 is connected to the extension motor 5 in an electrical control manner. A top end of the lower outer pipe 13 is provided with partition pipe string 14. An upper part of the partition pipe string 14 is connected to the three-stage choking assembly. A bottom part of the lower inner pipe 4 is provided with a partition plate, and the bottom part of the lower inner pipe 4 is fixedly connected to a top part of the lower partition plate 3.

A main function of the electrically-controlled telescopic assembly is to realize the positioning and clamping of the preset three-stage adjustable downhole choke with choking and pressure measurement functions and a preset seating nipple preset on a production tubing. A working principle of the electronic telescopic assembly is as follows. A working process of the electronic telescopic assembly is divided into a pushing process of the extension element 10 and a retraction process of the extension element 10. The pushing process of the extension element 10 is as follows. When the preset three-stage adjustable downhole choke with choking and pressure measurement functions reaches the vicinity of the preset seating nipple, a ground staff sends a wireless command to the electrical control system assembly 12. The electrical control system assembly 12 sends a forward rotation command to the extension motor 5. The telescopic rod 6 drives the push element 7 upward. Under the action of the push element 7, the extension element 10 is pushed out and fixed in an inner groove of the preset seating nipple to achieve positioning and clamping. At this time, the return spring 11 is in a stretched state. The retraction process of the extension element 10 is as follows. When it is necessary to fish the preset three-stage adjustable downhole choke with choking and pressure measurement functions back to the ground, the ground staff sends a wireless command to the electrical control system assembly 12. The electrical control system assembly 12 sends a reverse rotation command to the extension motor 5. The telescopic rod 6 drives the push element 7 downward. Under the action of the return spring 11, the extension element 10 disengages from the inner groove of the preset seating nipple. At this time, the preset three-stage adjustable downhole choke with choking and pressure measurement functions is not connected to the preset seating nipple. The extension motor 5 is a forward and reverse rotation motor.

The three-stage choking assembly includes outer pipe string 15 with a lower end connected to an upper end of the electrically-controlled telescopic assembly. That is, the lower end of the outer pipe string 15 is fixedly connected to the upper end of the partition pipe string 14. Inner pipe string 17 is nested in the outer pipe string 15. A central boss of the inner pipe string 17 is threaded with the first-stage control choke 30. Intermediate pipe string 16 is nested between the outer pipe string 15 and the inner pipe string 17. An upper part of the intermediate pipe string 16 is provided with the second-stage adjustable control choke 29. A lower part of the second-stage adjustable control choke 29 is provided with second-stage control choke placement sleeve 20. A lower part of the second-stage control choke placement sleeve 20 is fixedly connected to an upper part of the inner pipe string 17.

The second-stage adjustable control choke includes bottom annulus 34 and top annulus 35. Rotary table 36 is provided in the bottom annulus 34. A plurality of blades 37 are uniformly distributed between the rotary table 36 and the top annulus 35. Upper and lower ends of each of the blades 37 are provided with positioning posts 38, respectively. The positioning posts 38 are arranged in track slots 39 on the top annulus 35 and the rotary table 36, respectively. Throttling shell 40 is provided between the bottom annulus 34 and the top annulus 35. Outer shell 41 is sleeved outside the choking shell 40. A bottom part of the outer shell 41 is fixedly connected to a top part of the second-stage control choke placement sleeve 20. Gear 42 meshing with an outer edge of the rotary table 36 is further provided in the bottom annulus 34. That is, the outer edge of the rotary table 36 is provided with teeth meshing with the gear 42. The gear 42 is dynamically connected to rotating shaft 19. The rotating shaft 19 is drivingly connected to rotating motor 18. The rotating motor 18 is provided between the upper part of the intermediate pipe string 16 and the upper part of the inner pipe string 17. The rotating motor 18 is connected to the electrical control system assembly 12 in an electrical control manner. The gear 42 drives the rotary table 36 to rotate, and the blades 37 on the rotary table 36 move according to tracks of the track slots 39 on the rotary table 36 and the top annulus 35. In this way, the blades 37 move towards or away from a center of the rotary table 36, so as to reduce a center orifice diameter of the rotary table 36 or increase the center orifice diameter of the rotary table 36, thus changing the orifice diameter of the second-stage adjustable control choke 29. Specifically, there are six blades 37. Each of the track slots 39 is hexagonal, and one blade 37 is provided on each side of the track slot. These blades 37 can move inward in the track slots to reduce the orifice diameter of the second-stage adjustable control choke 29 or move outward to increase the orifice diameter of the second-stage adjustable control choke 29.

Third-stage control choke positioning pipe string 21 is nested in an upper part of the outer pipe string 15. Connecting pipe 23 is nested in an upper part of the third-stage control choke positioning pipe string 21. An inner lower part of the connecting pipe 23 is threaded with the third-stage control choke 28. An inner central part of the connecting pipe 23 is fixedly provided with spring fixing seat 25. The spring fixing seat 25 is provided with a vent hole. An upper end of the third-stage control choke 28 is provided with conical head 27. The conical head 27 is connected to the spring fixing seat 25 through compression spring 22. The compression spring 22 is provided with displacement sensor 26. The displacement sensor 26 is connected to the electrical control system assembly 12 in a communication manner. Fishing head 24 is sleeved outside an upper end of the connecting pipe 23. A lower part of the fishing head 24 is fixedly connected to the outer pipe string 15. In the present disclosure, the matching design of the displacement sensor 26, the compression spring 22, and the conical head 27 facilitates calculation of an output pressure of the third-stage control choke 28 at any time according to the displacement of the conical head 27. The pressure measurement method is simple and reliable, improves the pressure measurement efficiency, and can feed back the pressure to a ground system. The ground staff decides whether to adjust the orifice diameter of the second-stage adjustable control choke 29 according to the third-stage natural gas pressure. In addition, measuring the output pressure of the third-stage control choke 28 can also help the ground staff to further understand the real downhole conditions, so as to facilitate the follow-up of other downhole work. The first-stage control choke 30 is configured to choke and depressurize the high-pressure natural gas for a first time so as to effectively protect the second-stage adjustable control choke 29 and the third-stage control choke 28. The second-stage adjustable control choke 29 has an adjustable orifice diameter to achieve different choking and depressurization capabilities. The third-stage control choke 28 realizes the third-stage choking and depressurization, and the third-stage control choke 28 cooperates with the compression spring 22, the displacement sensor 26, and the conical head 27. After passing through the third-stage control choke 28, the natural gas impacts the conical head 27 and compresses the above compression spring 22. The data measured by the displacement sensor 26 can be converted into the pressure of the natural gas passing through the third-stage control choke 28 and fed back to the ground system. The ground staff can adjust the orifice diameter of the second-stage adjustable control choke 29 according to the third-stage natural gas pressure. The ground staff sends instructions to the electrical control system assembly 12. The electrical control system assembly 12 sends a regulation command to the rotating motor 18 to drive the rotating shaft 19 to rotate, thus controlling the rotation of the inner gear 42 of the second-stage adjustable control choke 29. The gear 42 drives the rotary table 36 to rotate. The blades 37 on the rotary table 36 move along the track slot 39 on the rotary table 36 in a predetermined path to achieve the adjustment of the orifice diameter.

In the present disclosure, the preset three-stage adjustable downhole choke with choking and pressure measurement functions includes the intake assembly, the electrically-controlled telescopic assembly, and the three-stage choking assembly. The intake assembly serves as the inlet of natural gas into the downhole choke. It filters sand and other impurities in the natural gas through the sand control cylinder 32 to ensure the quality of natural gas. The electrically-controlled telescopic assembly mainly realizes the positioning and clamping of the downhole choke and the preset seating nipple on the production tubing. The extension motor 5 rotates to drive the telescopic rod 6 up and down, so as to raise or lower the oblique push element 7. When the oblique push element 7 rises, it pushes the push rod 8. The push rod 8 moves outward to push out the extension element 10, such that the extension element 10 is fixed in the inner groove of the preset seating nipple, so as to realize the positioning and clamping of the downhole choke. When the oblique push element 7 is lowered, the extension element 10 is pulled by the return spring 11. The extension element 10 disengages from the preset seating nipple and retracts into the groove of the lower outer pipe 13. The positioning and clamping of the downhole choke with the preset seating nipple is released to facilitate the removal of the downhole choke. The three-stage choking assembly includes the first-stage control choke 30, the second-stage adjustable control choke 29, and the third-stage control choke 28. The first-stage control choke 30 performs first-stage choking and depressurization of the high-pressure natural gas, effectively protecting the second-stage adjustable control choke 29 and the third-stage control choke 28. The second-stage adjustable control choke 29 has an adjustable orifice diameter, which can achieve different choking and depressurization effects and obtain different flow rates and pressures. The third-stage control choke 28 realizes the third-stage choking and depressurization. In the present disclosure, the matching design of the displacement sensor 26, the compression spring 22, and the conical head 27 facilitates calculation of the output pressure of the third-stage control choke 28 at any time according to the displacement of the conical head 27. The pressure measurement method is simple and reliable, and improves the pressure measurement efficiency. The downhole choke of the present disclosure is further provided with the electrical control system assembly 12. According to the displacement data of the displacement sensor 26 received by the ground system, the rotating motor 18 is controlled to rotate so as to adjust the orifice diameter of the second-stage adjustable control choke 29. As required, the rotation of the extension motor 5 can be controlled to control the clamping and separation of the electrical telescopic device and the preset seating nipple. The design has a high level of automation, can realize intelligent control according to needs, and is convenient and reliable.

Certainly, the present disclosure may further include other various examples. A person skilled in the art can make various corresponding modifications and variations according to the present disclosure without departing from the spirit and essence of the present disclosure, but all these corresponding modifications and variations shall fall within the protection scope defined by the appended claims in the present disclosure.

What is claimed is:

1. A preset three-stage adjustable downhole choke with choking and pressure measurement functions, comprising an intake assembly for natural gas filtration, an electrically-controlled telescopic assembly for positioning and clamping the downhole choke with a prefabricated seating nipple, and a three-stage choking assembly for natural gas choking and depressurization, wherein the intake assembly, the electrically-controlled telescopic assembly, and the three-stage choking assembly are sequentially communicated from bottom to top; and a first-stage control choke (30), a second-stage adjustable control choke (29), and a third-stage control choke (28) are sequentially provided in a gas passage of the three-stage choking assembly from bottom to top;

the three-stage choking assembly comprises an outer pipe string (15) with a lower end connected to an upper end of the electrically-controlled telescopic assembly; an inner pipe string (17) is nested in the outer pipe string (15); a central boss of the inner pipe string (17) is threaded with the first-stage control choke (30); an intermediate pipe string (16) is nested between the outer pipe string (15) and the inner pipe string (17); an upper part of the intermediate pipe string (16) is provided with the second-stage adjustable control choke (29); a lower part of the second-stage adjustable control choke (29) is provided with a second-stage control choke placement sleeve (20); and a lower part of the second-stage control choke placement sleeve (20) is fixedly connected to an upper part of the inner pipe string (17); and the second-stage adjustable control choke (29) comprises a bottom annulus (34) and a top annulus (35); a rotary table (36) is provided in the bottom annulus (34); a plurality of blades (37) are uniformly distributed between the rotary table (36) and the top annulus (35); upper and lower ends of each of the blades (37) are provided with positioning posts (38), respectively; the positioning posts (38) are arranged in track slots (39) on the top annulus (35) and the rotary table (36), respectively; a choking shell (40) is provided between the bottom annulus (34) and the top annulus (35); an outer shell (41) is sleeved outside the choking shell (40); a bottom part of the outer shell (41) is fixedly connected to a top part of the second-stage control choke placement sleeve (20); a gear (42) meshing with an outer edge of the rotary table (36) is further provided in the bottom annulus (34); the gear (42) is dynamically connected to a rotating shaft (19); the rotating shaft (19) is drivingly connected to a rotating motor (18); the rotating motor (18) is provided between the upper part of the intermediate pipe string (16) and the upper part of the inner pipe string (17); and the rotating motor (18)

is connected to an electrical control system assembly (12) in an electrical control manner.

2. The preset three-stage adjustable downhole choke with the choking and pressure measurement functions according to claim 1, wherein the intake assembly comprises a bottom stopper (1) and an intake cylinder (2) sleeved on the bottom stopper (1); and the intake cylinder (2) comprises an upper part threadedly sleeved with a lower partition plate (3) connected to the electrically-controlled telescopic assembly and a lower part provided with an intake opening (33).

3. The preset three-stage adjustable downhole choke with the choking and pressure measurement functions according to claim 2, wherein a plurality of intake openings (33) are uniformly arranged on a lower wall of the intake cylinder (2); and a sand control cylinder (32) is provided in the intake openings (33), and the sand control cylinder is coaxial with the intake cylinder (2).

4. The preset three-stage adjustable downhole choke with the choking and pressure measurement functions according to claim 1, wherein the electrically-controlled telescopic assembly comprises a lower outer pipe (13) with a bottom part connected to the intake assembly; a lower inner pipe (4) is nested in the lower outer pipe (13); a circular packing sleeve (31) is nested between the lower outer pipe (13) and the lower inner pipe (4); and a telescopic positioning device is arranged between the lower outer pipe (13) and the circular packing sleeve (31).

5. The preset three-stage adjustable downhole choke with the choking and pressure measurement functions according to claim 4, wherein the telescopic positioning device comprises an extension element (10) provided on a side wall of the lower outer pipe (13); the extension element (10) is provided in a groove on the side wall of the lower outer pipe (13) through a return spring (11); an inner central part of the extension element (10) is fixedly connected to a push rod (8); the push rod (8) penetrates the side wall of the lower outer pipe (13) and extends into a space between the lower outer pipe (13) and the circular packing sleeve (31); an extension motor (5) is provided between the lower outer pipe (13) and the circular packing sleeve (31); the extension motor (5) is drivingly connected to a telescopic rod (6); an end of the telescopic rod (6) away from the extension motor (5) is fixedly connected to an oblique push element (7); and the oblique push element (7) is connected to the push rod (8) in a contact manner.

6. The preset three-stage adjustable downhole choke with the choking and pressure measurement functions according to claim 5, wherein a plurality of telescopic positioning devices are uniformly distributed on the side wall of the lower outer pipe (13); a pulley (9) is rotatably connected to the push rod (8) and is away from the extension element (10); and the pulley (9) is connected to the oblique push element (7) in a contact manner.

7. The preset three-stage adjustable downhole choke with the choking and pressure measurement functions according to claim 5, wherein the electrical control system assembly (12) is provided between the lower inner pipe (4) and the circular packing sleeve (31); the electrical control system assembly (12) is connected to the extension motor (5) in an electrical control manner; a top end of the lower outer pipe (13) is provided with a partition pipe string (14); and an upper part of the partition pipe string (14) is connected to the three-stage choking assembly.

8. The preset three-stage adjustable downhole choke with the choking and pressure measurement functions according to claim 1, wherein a third-stage control choke positioning pipe string (21) is nested in an upper part of the outer pipe string (15); a connecting pipe (23) is nested in an upper part of the third-stage control choke positioning pipe string (21); an inner lower part of the connecting pipe (23) is threaded with the third-stage control choke (28); an inner central part of the connecting pipe (23) is fixedly provided with a spring fixing seat (25); the spring fixing seat (25) is provided with a vent hole; an upper end of the third-stage control choke (28) is provided with a conical head (27); the conical head (27) is connected to the spring fixing seat (25) through a compression spring (22); the compression spring (22) is provided with a displacement sensor (26); the displacement sensor (26) is connected to the electrical control system assembly (12) in a communication manner; a fishing head (24) is sleeved outside an upper end of the connecting pipe (23); and a lower part of the fishing head (24) is fixedly connected to the outer pipe string (15).

\* \* \* \* \*